(12) United States Patent
Knuutinen et al.

(10) Patent No.: US 8,528,922 B2
(45) Date of Patent: Sep. 10, 2013

(54) CHASSIS

(75) Inventors: Hannu Knuutinen, Kuopio (FI); Ismo Toivanen, Kuopio (FI)

(73) Assignee: Chasswheel Oy, Siilinjarvi (FI)

( * ) Notice: Subject to any disclaimer, the term of this patent is extended or adjusted under 35 U.S.C. 154(b) by 0 days.

(21) Appl. No.: 13/500,531

(22) PCT Filed: Oct. 9, 2009

(86) PCT No.: PCT/FI2009/050805
§ 371 (c)(1),
(2), (4) Date: May 11, 2012

(87) PCT Pub. No.: WO2011/042591
PCT Pub. Date: Apr. 14, 2011

(65) Prior Publication Data
US 2012/0217732 A1  Aug. 30, 2012

(51) Int. Cl.
*B60G 1/04* (2006.01)

(52) U.S. Cl.
USPC .................................................. 280/124.11

(58) Field of Classification Search
USPC .............. 280/781, 124.11, 124.111, 124.128, 280/124.132, 124.133, 124.134, 124.135, 280/124.136
See application file for complete search history.

(56) References Cited

U.S. PATENT DOCUMENTS

| | | | |
|---|---|---|---|
| 2,029,540 A * | 2/1936 | Porteous | 280/103 |
| 2,598,863 A | 6/1952 | Tucker | |
| 3,055,520 A | 9/1962 | Hardman | |
| 3,504,928 A * | 4/1970 | Reimer | 280/104 |
| 4,688,811 A | 8/1987 | Knuutinen | |
| 5,772,237 A | 6/1998 | Finch et al. | |

FOREIGN PATENT DOCUMENTS

| | | |
|---|---|---|
| DE | 2 256 934 A1 | 5/1973 |
| GB | 1903 16 378 A | 7/1903 |

OTHER PUBLICATIONS

International Preliminary Report on Patentability issued in Application No. PCT/FI2009/050805; Dated Dec. 30, 2011.
International Search Report issued in Application No. PCT/FI2009/050805; Dated Jul. 9, 2010.

\* cited by examiner

*Primary Examiner* — Faye M. Fleming
(74) *Attorney, Agent, or Firm* — Birch, Stewart, Kolasch & Birch, LLP

(57) ABSTRACT

A chassis for a vehicle includes a frame as well as a first axle and a second axle, on which the wheels of the vehicle are mounted on bearings. The axles are connected to the frame to swivel at least with respect to a vertical axis and a longitudinal axis, and are connected to each other by means of mechanisms for transmitting motion in such a way that the movements of the first axle are transmitted to the second axle, and vice versa. In the chassis, the mechanisms for transmitting the motion includes arms for transmitting motion between the axles, and the arms are configured to remain primarily parallel to the longitudinal direction of the frame, irrespective of the movements of the axles.

6 Claims, 3 Drawing Sheets

CHASSIS

Figure 1:
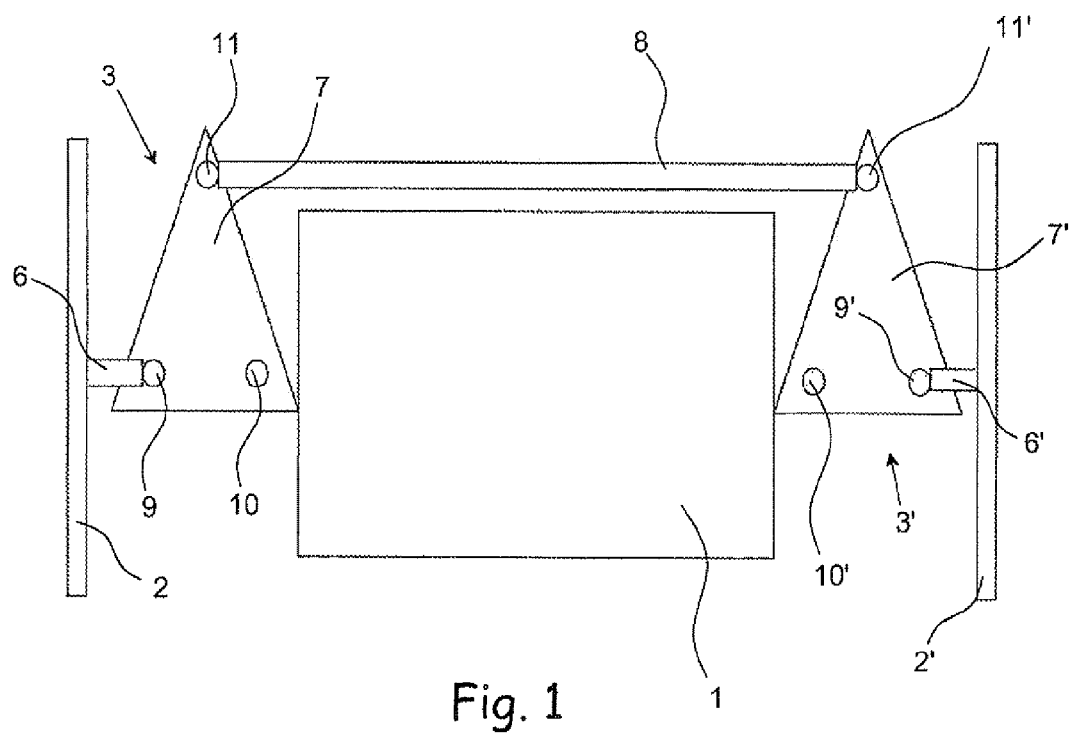

At present, constructions for a chassis of a vehicle are known, which are equipped with axles movable in a way depending on each other and which can be used to resist the swaying of the vehicle when moving on uneven terrain. In such a chassis, the idea is that the sinking of one or some of the wheels of the vehicle into an indentation in the ground surface or the rising onto a bump will also affect the position of the other wheels in such a way that the tilting and swaying of the vehicle is damped and the road holding is improved.

Such a chassis structure is disclosed, for example, in FI 73175. In said publication, the wheels of the vehicle are mounted on bearings on axle beams connected to the frame of the vehicle by means of a ball joint or another joint with a corresponding function in such a way that the axle can pivot in relation to two axes with respect to the frame of the vehicle. The joints between the axle beams and the frame are arranged in the lower part of the axle beams. In the upper part of the axle beams, second corresponding (ball) joints are provided in the same position as these joints. Between these upper joints, a supporting arm or a supporting mechanism formed of supporting arms is connected to the frame in a swiveling manner. Thanks to this supporting arm or mechanism, the tilting movement of the first axle is transmitted to the second axle in such a way that the second axle tends to tilt in the opposite direction with respect to the first axle. Thus, when the wheel of the vehicle passes over an indentation or a bump in the ground surface, that is, when the axle is tilting, the supporting arm or mechanism will tilt the second axle in the opposite direction. Consequently, the chassis structure damps tilting and stabilizes the travel of the vehicle on uneven terrain. The stabilization of the chassis functioning in this way can also be made suitably flexible and cushioned by applying supporting arms and other structures with a suitable rigidity in the frame of the chassis.

In the chassis structure according to FI 73175, there is also a steering mechanism formed of two tie rods and a steering-knuckle arm connected to them, for the purpose of adjusting the position of the axles with respect to a vertical axle, that is, to steer the vehicle in the travel direction. This steering mechanism is provided at the lower ball joints in the vertical direction. The tie rods are connected at their first end to the opposite ends of the successive axle beams in an articulated manner and are connected at their second end in an articulated manner to the steering-knuckle arm articulated at the centre of the frame. Thus, by moving the steering-knuckle arm, it is possible to steer the chassis in the travel direction, that is, the wheels can be steered to be parallel or they can be turned in opposite directions with respect to each other, wherein the vehicle can be turned in a desired direction.

The above-described chassis structure is functional as such, and it can be used to stabilize the position of a vehicle or a working machine and to improve the road holding and the steerability on uneven terrain. Thanks to these good properties, such a chassis structure has been utilized, among other things, in a wheelchair developed by the applicant, which is suitable for moving on uneven terrain. As described above, the supporting arm or supporting mechanism formed of supporting arms, applied to compensate for tilting must nevertheless, in a chassis like the one described in FI 73175, be placed at a sufficient distance above the point of articulation of the axle beams so that the movement caused by the tilting of the axles can be transmitted from the first axle to the second axle. In the configuration presented in FI 73175, the result is that the supporting arm or the mechanism formed of supporting arms must always be placed at some distance above the point of bearing of the axle beams. This increases the need of space for the chassis structure in the height direction of the vehicle, which, among other things, moves the centre of gravity of the vehicle slightly higher than in vehicles with a conventional chassis structure. For example, in wheelchairs intended for use on terrain, this means that the sitting height in a wheelchair with such a chassis structure will be slightly greater than normally. Furthermore, because of the supporting arms, no space is left under the seat of the wheelchair for other purposes, for example for placing a battery under the seat as is conventional in an electric wheelchair.

It is an aim of the present invention to disclose a novel chassis for stabilizing the moving of a vehicle on uneven terrain and for improving its road holding, to eliminate the above-mentioned drawbacks involved in the prior art. In particular, it is an aim of the invention to introduce a chassis that requires less space than before in the height direction of the vehicle. Furthermore, it is an aim of the invention to disclose a chassis that functions in the above-described manner and also takes less space in the central parts of the chassis so that more space than before is left in the central sections of the lower part of the chassis, wherein, for example in the case of an electrically driven wheelchair, a battery can be placed under the seat.

The inventive idea of the chassis according to the invention is that for the transmission of the tilting motions and steering motions of the axles connected by a ball joint or a corresponding joint to the frame of the chassis, such motion transmitting mechanisms are used, in which the transfer of motions between the axles is arranged primarily by motion transfer members remaining parallel to the longitudinal direction of the frame of the chassis, which members can be placed, particularly in the area of the central sections of the frame, lower than the configuration presented in FI 73175 and which do not require space in the central sections of the frame. To put it more precisely, the chassis according to the invention is characterized in what will be presented in the characterizing part of claim 1.

The chassis according to the invention provides significant advantages to the prior art. The chassis according to the invention can be made lower than before, wherein the centre of gravity of the vehicle can also be arranged lower than before. Thanks to this, the ground clearance of the vehicle can be increased without raising the centre of gravity too high. This improves the possibilities of moving and riding comfort on uneven terrain. Furthermore, in the chassis according to the invention, no supporting arms or other parts needed for steering the axles are needed in the central section of the chassis; consequently, other parts of the vehicle can placed in this space, if desired. For example, when such a chassis is used in an electrically driven wheelchair, a battery used as the source of energy for the wheelchair can be placed under the seat. In the case of a wheelchair, the sitting height can also be arranged lower than before. This makes it easier for the user of the wheelchair to move onto and off the seat of the wheelchair.

Figure 2:
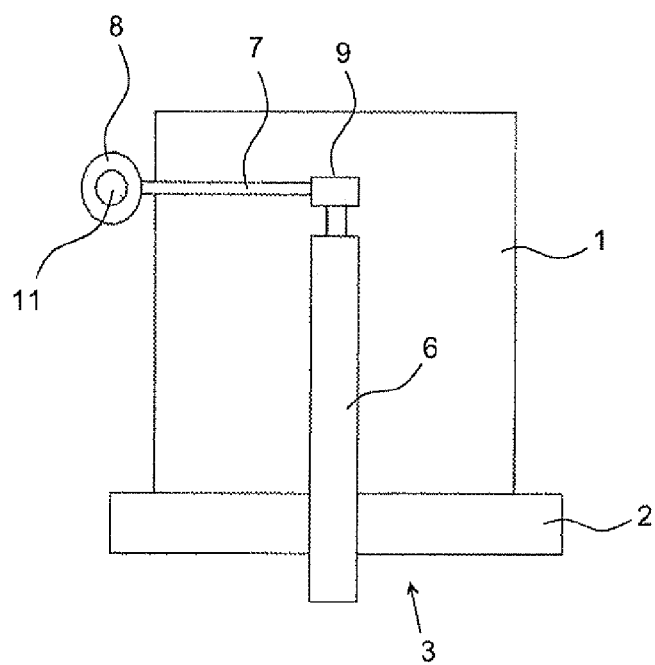
Figure 3:
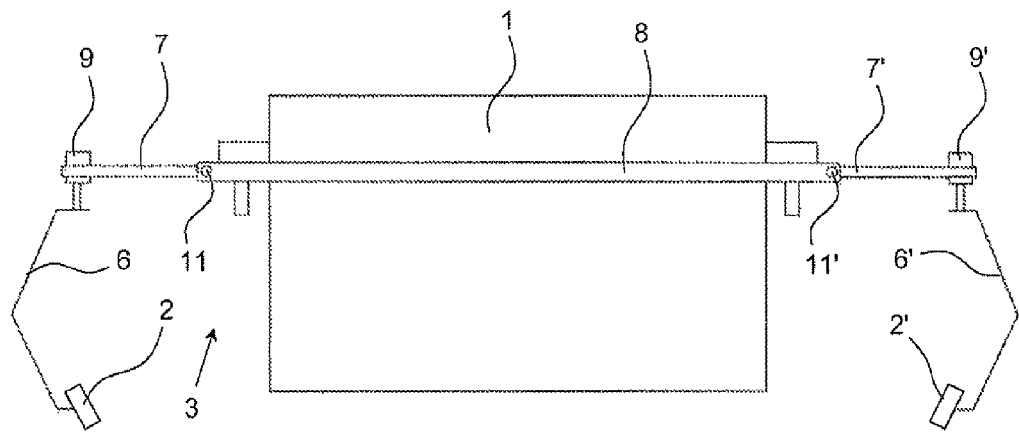
Figure 4:
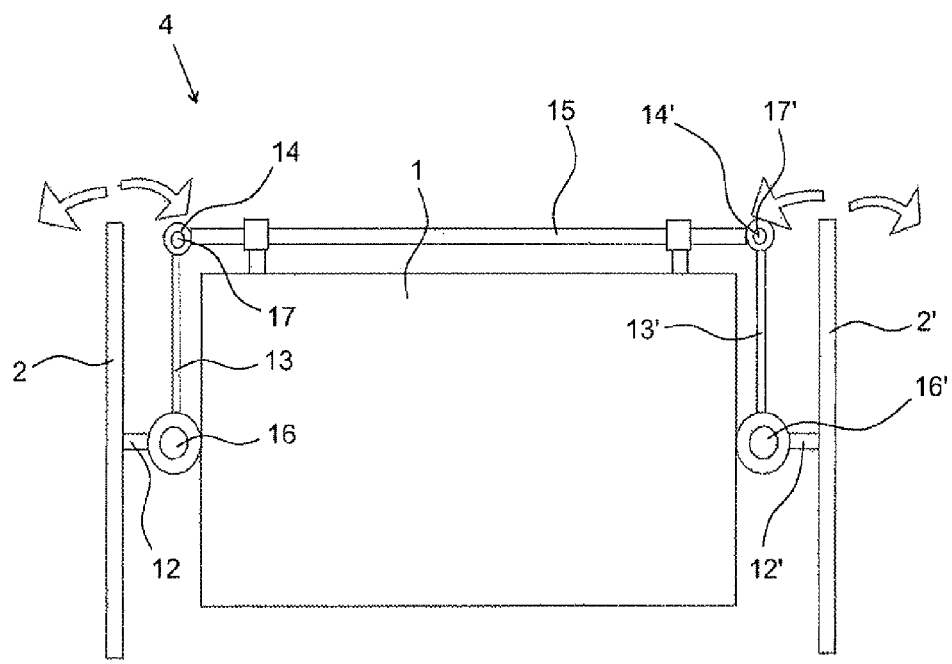
Figure 5:
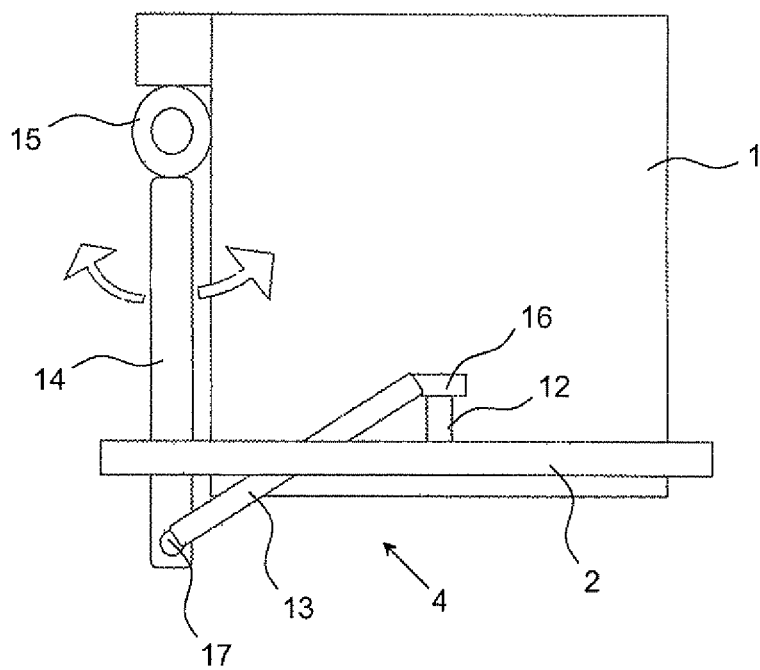
Figure 6:
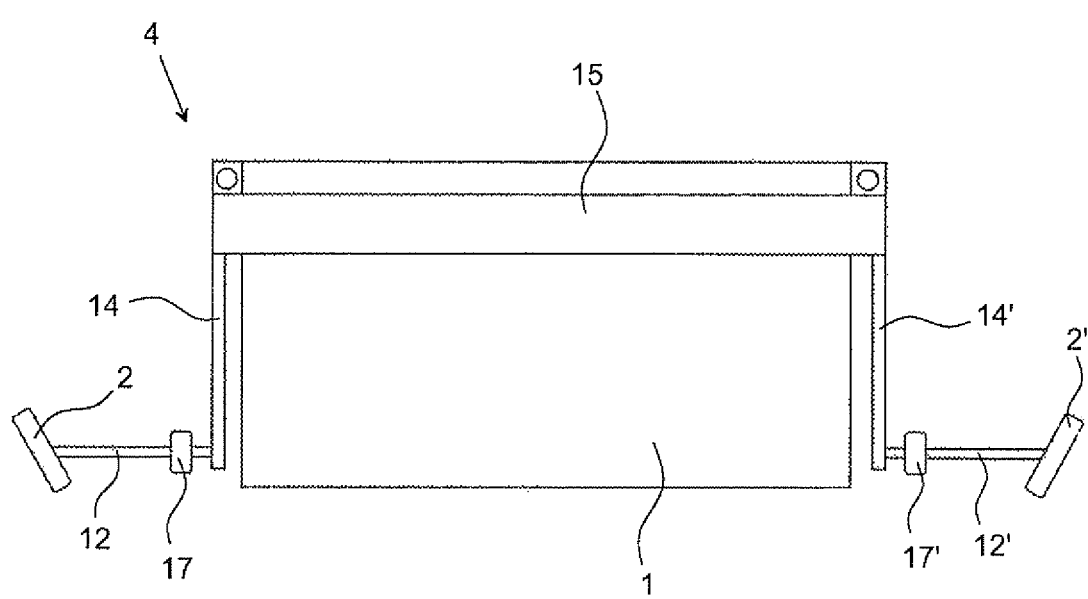

In the following, the invention will be described in more detail with reference to the appended drawings, in which FIG. 1 shows the frame, axles, and mechanism for transmitting the tilting motion in a chassis according to the invention, seen from below, FIG. 2 shows the frame, axles, and mechanism for transmitting the tilting motion in the chassis of FIG. 1, seen from the front, FIG. 3 shows the frame, axles and mechanism for transmitting the tilting motion in the chassis of the preceding figures, seen from the side, FIG. 4 shows the frame, axles, and mechanism for transmitting the swiveling motions in a chassis according to the preceding figures, seen from below, FIG. 5 shows the frame, axles, and mechanism for transmitting the swiveling motions in a chassis according to the preceding figures, seen from the front, and FIG. 6 shows the frame, axles, and mechanism for transmitting the swiveling motions in a chassis according to the preceding figures, seen from the side.

In the application of a chassis according to the invention, shown in FIGS. 1 to 6, the frame 1 of the chassis has the shape of a box-like piece, to which other parts of the chassis are connected. For example, the axles 2 and 2' belonging to the chassis are connected outside the first and second end of the frame by ball joints or other joints at the centre points of the axles 2 and 2', enabling the corresponding movements of the axles. This mounting, known as such, is not shown in FIGS. 1 to 6, to facilitate the illustration of the principles of operation of the mechanisms 3 and 4 for transmitting motion. Furthermore, FIGS. 1 to 3, which show the mechanism 3 for transmitting the tilting motion of the axles, do not show the mechanism 4 for transmitting the swiveling motions illustrated in FIGS. 4 to 6. In a corresponding manner, FIGS. 4 to 6, which show the mechanism 4 for transmitting the swiveling motions, do not illustrate the mechanism 3 for transmitting the tilting motions illustrated in FIGS. 1 to 3. Both mechanisms 3 and 4 for transmitting motions, illustrated in FIGS. 1 to 6, can, however, be installed in the same chassis.

The mechanism 3 for transmitting tilting motions, illustrated in FIGS. 1 to 3, comprises a vertical arm 6 fixed at its first end in a stationary manner in the vertical position to the centre point of the first axle 2. Furthermore, the mechanism 3 for transmitting tilting motions comprises a wishbone arm 7 connected at its first end in an articulated manner to the second, free end of the vertical arm and connected at its second end in an articulated manner to the frame 1, and to whose third end is connected, in an articulated manner, the first end of the transmission arm 8 of the tilting motion also belonging to this mechanism. As shown in FIGS. 1 to 3, both axles 2 of the chassis comprise separate vertical arms 6 and 6' as well as wishbone arms 7 and 7', but the transmission arm 8 of the tilting motion is a common part between the third ends of the wishbone arms 7 and 7'. Because the vertical arms 6 and 6' must be capable of swiveling with respect to the wishbone arms 7 and 7' and, to some extent, also slightly with respect to the longitudinal axis of the frame 1 (so that the connecting points between the vertical arms 6 and 6' and the wishbone arms 7 and 7' can move to some extent also in the vertical direction, thanks to the curved motion path of the second end of the vertical arms), the joints 9 and 9' between the second end of the vertical arms 6 and 6' and the first end of the wishbone arms 7 and 7' have to be joints capable of swiveling with respect to two axes, that is, for example ball joints. For this reason, the joints 10 and 10' between the frame 1 and the second end of the wishbone arms 7 and 7', as well as the joints 11 and 11' between the third end of the wishbone arms 7 and 7' and the first and second ends of the arm 8 for transmitting the tilting motion have to be joints that allow a pivoting movement with respect to two axles, that is, for example ball joints. Furthermore, it should be noted that in this embodiment, the connecting points between the joints 11 and 11' at both ends of the arm 8 for transmitting the tilting motion and the third end of the wishbone arms 7 and 7' have been made, as shown in FIG. 1, adjustable by means of adjustable fixing means. Thanks to them, small position errors of the axles, caused by dimensional variance or defects in form in the frame 1 of the chassis, in the axles 2, and/or in the parts of the mechanism 3 for transmitting the tilting motions, can be easily corrected by adjusting the fixing point between the wishbone arm 7 and/or 7' and the arm 8 for transmitting the tilting motion.

As mentioned above, the arm 8 for transmitting the tilting motion is connected in an articulated manner at its both ends to the wishbone arms 7 and 7'. The second wishbone arm 7', to which the second end of the arm 8 for transmitting the tilting motion is connected, is a wishbone arm connected to the second axle 2' (fully corresponding and parallel to the wishbone arm 7 in connection with the first axle 2). Consequently, the swiveling of the vertical arm 6 in the side direction of the frame, caused by the tilting motion of the first axle 2, causes a corresponding movement in the wishbone arm 7' in connection with the second axle 2'. This wishbone arm 7' in connection with the second axle, in turn, causes a movement, corresponding in its magnitude to the movement of the first axle, in the vertical arm 6' connected to it at its second end (and having the size and shape fully corresponding to the vertical arm 6 in connection with the first axle). However, because the wishbone arm 7' and the vertical arm 6' in connection with the second axle are mirror images of the wishbone arm and the vertical arm in connection with the first axle, this tilting motion of the second axle 2' has a direction opposite to that of the tilting motion of the first axle 2. Consequently, the mechanism 3 for transmitting the tilting motions corresponds, in its operation, fully to the operation of the mechanism for transmitting the tilting motion disclosed in FI 73175. Thus, the tilting in the vertical direction of the first axle 2 of a vehicle equipped with such a chassis, for example when one wheel mounted on this axle meets an indentation or a bump in the ground surface, will cause in the second axle 2' a tilting motion of corresponding magnitude but opposite direction, to balance the travel of the vehicle. The situation is the same if also the wheel on the side of the second axle, opposite to the first axle, meets simultaneously an indentation or a bump. However, the present mechanism 3 for transmitting the tilting motion does not comprise such supporting arms which would require as much space in the vertical direction of the chassis and have supporting or transmitting arms in the central part of the frame as in the solution of prior art disclosed in FI 73175. In other words, with the novel solution according to FIGS. 1 to 3, the above-mentioned drawbacks involved in the chassis structure according to FI 73175 are avoided.

The mechanism 4 for transmitting the swiveling motion, disclosed in FIGS. 4 to 6, comprises a swiveling arm 12 fixed at its first end to the axle 2 in a stationary manner and extending (when the axle is straight as shown in FIG. 1) to a distance from the axle along the longitudinal direction of the frame 1 (in the direction of the frame). Furthermore, the mechanism 4 for transmitting the swiveling motion comprises a transfer arm 13 connected at its first end to the second end of the swiveling arm 12 in an articulated manner, and a pivoting arm 14 connected at its first end to the second end of the transfer arm 13 in an articulated manner and connected to an arm 15 for transmitting the swiveling motion, mounted on bearings to pivot around its longitudinal axis. The arm 15 for transmitting the swiveling motion is parallel to the longitudinal direction of the frame and is placed, for example, to one side of the frame 1 with respect to the arm 9 for transmitting the tilting motion. The joints 16 and 17 between the swiveling arm 12 and the transfer arm 13 and between the transfer arm 13 and the pivoting arm 14 are joints that are capable of pivoting with respect to two axes, that is, for example ball joints, because when the axle turns, the transfer arm 13 will turn in relation to two axes with respect to the swiveling arm 12 and the pivoting arm 14.

Also in this mechanism for transmitting motion, the swiveling arm 12, the transfer arm 13 and the pivoting arm 14 of the first axle 2 of the chassis, as well as the swiveling arm 12', the transfer arm 13' and the pivoting arm 14' of the second axle 2 are identical and parallel to each other when the axles are straight, that is when the wheels mounted on the axles 2 and 2' are aligned. In connection with the second axle, there are also ball joints 16' and 17' corresponding to the ball joints 16 and 17 in connection with the first axle. Thus, the swiveling motion of the first axle 2 will cause a swiveling motion of equal magnitude in the second axle 2'. However, the direction of this swiveling motion will be opposite, because the swiveling arm 12, the transfer arm 13 and the pivoting arm 14 of the first axle 2 are mirror images of the swiveling arm 12', the transfer arm 13' and the pivoting arm 14' of the second axle. Furthermore, it should be noted that in the mechanism for transmitting the swiveling motion, shown in FIGS. 4 to 6, both the transfer arms 13 and 13' are made to be adjustable in length so that the axles 2 and 2' can be adjusted to be precisely parallel when they are in a position transverse to the longitudinal direction of the frame.

Thus, the chassis equipped with the mechanisms 3 and 4 for transmitting motion, shown in FIGS. 1 to 6, also corresponds to the chassis presented in FI 73175, with respect to the operation of the mechanism 4 for transmitting the swiveling motion. Thanks to the mechanism for transmitting the swiveling motion, the wheels of a vehicle equipped with such a chassis always turn equally in opposite directions. Thus, the movements of turning all the wheels can be controlled simultaneously, for example, by connecting a linear actuator or a mechanical steering-knuckle arm, for example, to one of the pivoting arms 14 or 14'. A linear actuator may be configured to be controlled by means of, for example, a control lever (such as a joystick). The mechanical control lever, in turn, can be moved by means of, for example, a steering wheel or rod. The steering may also be implemented by means of both of these so that the actuator is only configured to assist in the implementation of the manual steering movements, in other words, it is used as a power steering.

In many respects, the chassis according to the invention can be implemented in a way different from the above-presented example embodiment. For example, in the wishbone arms of the mechanism for transmitting the tilting motions, one embodiment could comprise a fourth end on the side opposite to the third end. Thus, a second transmitting arm could be included in the mechanism for transmitting the tilting motion, to increase the rigidity of the transmitting mechanism. Such a configuration could be applied, for example, in a heavy-duty vehicle, in which the axles are subjected to very high forces. It should also be noted that in many respects, many structural details of the mechanisms for transmitting motion can be implemented in a variety of ways. For example, the structure of the different joints as well as the materials, lengths, thicknesses, shapes, and ways of fixing of the supporting and transmitting arms may vary in different embodiments of the chassis according to the invention. Furthermore, the supporting arms in connection with the different axles do not necessarily need to be identical. The suitable movement lengths can be, for example, proportioned to the length of the axles. In some cases, it is also possible to produce motions of different magnitudes, for example in different axles. For instance, in the mechanism for transmitting the swiveling motion, this can be utilized to turn, for example, one end (e.g. the front end) of the vehicle more abruptly than the other end (e.g. the rear end) by a steering movement of a given magnitude.

The invention is not limited to the above-presented example embodiments, but it may vary within the scope of the inventive idea presented in the appended claims.

The invention claimed is:

1. A chassis for a vehicle, the chassis comprising:
   a frame;
   a first axle and a second axle, to which wheels of the vehicle are mounted on bearings, the first and second axles being connected to the frame to swivel with respect to at least a vertical axis and a longitudinal axis in relation to the frame; and
   transmitting mechanisms, the first and second axles being connected to each other by the transmitting mechanisms for transmitting motion in such a way that movements of the first axle are transmitted to the second axle and vice versa,
   wherein the transmitting mechanisms comprise arms for transmitting motion, said arms for transmitting motion being provided between the first and second axles and configured to remain substantially parallel to the longitudinal direction of the frame in spite of the movements of the first and second axles, and wherein the arms for transmitting motion are placed on a side of the frame, and
   wherein the transmitting mechanisms comprise other arms provided between the arms for transmitting motion and the axles, said other arms being arranged to convert tilting movements of the axles of the chassis to primarily linear movements parallel to the longitudinal direction of the frame, and convert swiveling movements of the axles of the chassis to primarily pivoting movements with respect to the longitudinal axis of the frame.

2. The chassis according to claim 1, wherein the transmitting mechanisms comprise a tilting motion transmitting mechanism for transmitting a tilting motion of the axles and a swiveling motion transmitting mechanism for transmitting a swiveling motion of the axles, and wherein said arms for transmitting motion comprise an arm for transmitting the tilting motion and an arm for transmitting the swiveling motion.

3. The chassis according to claim 2, wherein the tilting motion transmitting mechanism for transmitting the tilting motion comprises the arm for transmitting the tilting motion, said arm for transmitting the tilting motion being arranged to move primarily in the longitudinal direction of the frame and coupled at its first end by means of arms to the first axle and at its second end by means of arms to the second axle.

4. The chassis according to claim 3, wherein the mechanism for transmitting the tilting motion comprises a vertical arm extending primarily in the vertical direction to a distance away from its fixing point at a first end of the vertical arm, as well as a wishbone arm, a first end of the wishbone arm being connected in an articulated manner to a second end of the vertical arm, a second end of the wishbone arm being connected in an articulated manner to the frame, and a third end of the wishbone arm being connected in an articulated manner to the arm for transmitting the tilting motion, wherein when the axle tilts, the vertical arm turns the wishbone arm and the wishbone arm moves the arm for transmitting the tilting motion, connected to the same, primarily in its longitudinal direction.

5. The chassis according to claim 2, wherein the swiveling motion transmitting mechanism for transmitting the swiveling motion comprises an arm for transmitting the swiveling motion, said arm for transmitting the swiveling motion being arranged to pivot with respect to its longitudinal axis and coupled at its first end by means of arms to the first axle and at its second end by means of arms to the second axle.

6. The chassis according to claim 5, wherein the mechanism for transmitting the swiveling motion comprises a swiveling arm extending in the longitudinal direction of the frame to a distance away from the fixing point of the axle, a transfer arm articulated at an end of the swiveling arm, and a pivoting arm articulated at a first end of the transfer arm and connected at its second end to the arm for transmitting the swiveling motion, mounted on bearings with respect to its longitudinal axis on the frame and having a pivoting motion, wherein when the axle is swiveled, the swiveling arm moves the transfer arm, and the transfer arm pivots the arm for transmitting the swiveling motion, by means of the pivoting arm.

* * * * *